(12) United States Patent
Enoki et al.

(10) Patent No.: US 10,690,989 B2
(45) Date of Patent: Jun. 23, 2020

(54) OPTICAL MODULATION DEVICE AND METHOD FOR CONTROLLING OPTICAL MODULATION DEVICE

(71) Applicant: Mitsubishi Electric Corporation, Chiyoda-ku (JP)

(72) Inventors: Kentaro Enoki, Chiyoda-ku (JP); Tsuyoshi Yoshida, Chiyoda-ku (JP); Yasuhisa Shimakura, Chiyoda-ku (JP); Eiji Yagyu, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/095,842

(22) PCT Filed: May 16, 2017

(86) PCT No.: PCT/JP2017/018309
§ 371 (c)(1),
(2) Date: Oct. 23, 2018

(87) PCT Pub. No.: WO2017/208803
PCT Pub. Date: Dec. 7, 2017

(65) Prior Publication Data
US 2020/0033691 A1    Jan. 30, 2020

(30) Foreign Application Priority Data
Jun. 2, 2016  (JP) .................. 2016-111014

(51) Int. Cl.
*G02F 1/225* (2006.01)
*G02F 1/01* (2006.01)
(Continued)

(52) U.S. Cl.
CPC ............ *G02F 1/225* (2013.01); *G02F 1/0121* (2013.01); *H04B 10/516* (2013.01);
(Continued)

(58) Field of Classification Search
None
See application file for complete search history.

(56) References Cited

U.S. PATENT DOCUMENTS 6,687,451 B1 * 2/2004 Sikora ............... G02F 1/0123
398/187
2008/0080872 A1 * 4/2008 Tanaka ............... H04B 10/505
398/186
(Continued)

FOREIGN PATENT DOCUMENTS

| JP | 2002-328348 A | 11/2002 |
| JP | 2002328348 A * | 11/2002 |

(Continued)

OTHER PUBLICATIONS

International Search Report dated Aug. 15, 2017 in PCT/JP2017/018309 filed May 16, 2017.

*Primary Examiner* — David W Lambert
(74) *Attorney, Agent, or Firm* — Oblon, McClelland, Maier & Neustadt, L.L.P.

(57) ABSTRACT

A superposition circuitry superposes a dither signal on a reference DC bias voltage and outputs a resultant voltage as a bias voltage to an MZ modulator, during control of a driving voltage amplitude. During the control of the driving voltage amplitude to the MZ modulator, an amplitude setter determines, by varying the amplitude of an output voltage from an amplifier, a plurality of amplitudes of output curves from a synchronous detector, each of which is obtained by varying the reference DC bias voltage output from a bias controller, and the amplitude setter sets the amplification factor of the amplifier, based on an amplitude of the output voltage from the amplifier that corresponds to an amplitude satisfying a predetermined condition, out of the plurality of the amplitudes of the output curves from the synchronous detector.

6 Claims, 11 Drawing Sheets

(51) Int. Cl.
*H04B 10/516* (2013.01)
*G02F 1/21* (2006.01)

(52) U.S. Cl.
CPC .... *G02F 2001/212* (2013.01); *G02F 2201/12* (2013.01); *G02F 2202/102* (2013.01); *G02F 2202/20* (2013.01)

(56) References Cited

U.S. PATENT DOCUMENTS

| | | | | |
|---|---|---|---|---|
| 2009/0060528 | A1* | 3/2009 | Takashima | H04B 10/505 398/186 |
| 2011/0013907 | A1* | 1/2011 | Sugihara | G02F 1/0123 398/38 |
| 2011/0164300 | A1* | 7/2011 | Shen | G02F 1/0123 359/238 |
| 2012/0288284 | A1* | 11/2012 | Yoshida | H04B 10/5053 398/186 |
| 2013/0148981 | A1* | 6/2013 | Yasuda | H04B 10/50575 398/185 |
| 2014/0334829 | A1 | 11/2014 | Akiyama | |
| 2015/0222365 | A1* | 8/2015 | Goebuchi | G02F 1/0123 398/188 |

FOREIGN PATENT DOCUMENTS

| | | |
|---|---|---|
| JP | 2012-257164 A | 12/2012 |
| JP | 2014-10189 A | 1/2014 |
| WO | WO 2013/114628 A1 | 8/2013 |
| WO | WO 2014/034047 A1 | 3/2014 |

* cited by examiner

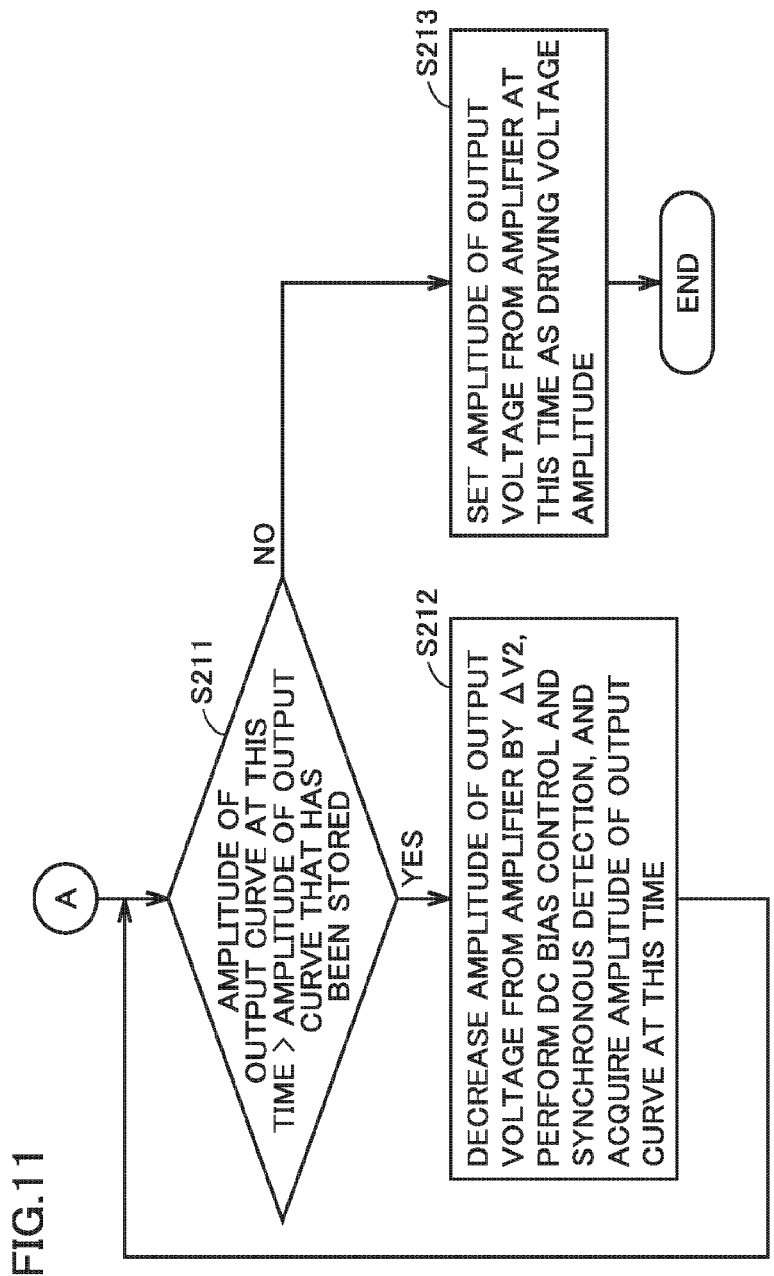

OPTICAL MODULATION DEVICE AND METHOD FOR CONTROLLING OPTICAL MODULATION DEVICE

TECHNICAL FIELD

The present invention relates to an optical modulation device and a method for controlling an optical modulation device, and relates to an optical modulation device using MZ (Mach-Zehnder) modulators and a method for controlling an optical modulation device.

BACKGROUND ART

As one modulation scheme for optical communication systems, there has been employed a direct modulation scheme for modulating a laser diode with a driving electric current to obtain light intensity signals proportional to electrical signals. This direct modulation scheme has an advantage of significantly-simple device structure. However, in ultra-high-speed/broad-band optical systems with transmission speeds larger than several Gbits per second, there have been induced wavelength fluctuation (chirping) phenomena that light wavelengths vary during direct modulations, which has imposed limitation on transmission capacities. Therefore, the direct modulation scheme has been utilized for optical communication systems with relatively lower speeds.

On the other hand, as optical modulation schemes for ultra-high speed transmissions, in order to suppress the chirping associated with the modulation, there have been employed outside modulation schemes adapted to continuously emit light from a semiconductor laser and to turn on and off the light with an outside modulator. Most ordinary modulators as such outside modulators are Mach-Zehnder modulators.

MZ modulators have the advantage of less chirping, but have induced the problem of inter-code interference in ON/OFF levels of light outputs, due to temperature changes, temporal changes and the like. There has been a need for overcoming this problem for stably controlling operating points in such Mach-Zehnder modulators. For example, Japanese Patent Laying-Open No. 2014-10189 (PTL 1), Japanese Patent Laying-Open No. 2012-257164 (PTL 2) and the like disclose bias stabilizing control through modulation schemes using NRZ (Non Return to Zero) codes and the like. These literatures suggest compensation techniques for detecting the amount of variation of an operating point and the direction of variation thereof through a low-frequency signal superposed on a driving voltage and for controlling the bias voltage through feedback to normally maintain the operating point. According to these controls, an optimum bias point is a substantially-intermediate point between a voltage (PEAK point) that turns on the light output and a voltage (NULL point) that turns off the light output.

Under the aforementioned circumstance, there has been also a need for bias stabilizing control in modulation schemes where an optimum driving voltage amplitude is $2V\pi$, such as BPSK (Binary Phase Shift Keying) or CSRZ (Carrier-Suppressed Return to Zero), and there have been suggested compensation techniques for detecting the amount of variation of an operating point and the direction of variation thereof through a dither (low-frequency signal) superposed on a bias voltage and for controlling the bias voltage through feedback to normally maintain the operating points.

In cases of ideal MZ modulators, in BPSK or CSRZ, the optimum bias point is at the voltage that turns off the light output (hereinafter, referred to as a NULL point) and, therefore, bias control is performed such that the bias point comes to be at the NULL point.

CITATION LIST

Patent Literature

PTL 1: Japanese Patent Laying-Open No. 2014-10189
PTL 2: Japanese Patent Laying-Open No. 2012-257164

SUMMARY OF INVENTION

Technical Problems

By using the techniques disclosed in PTLs 1 and 2, it is possible to determine the half wave voltage ($V\pi$) of an MZ modulator and to set the driving voltage amplitude to be $V\pi$, in order to perform control, with NRZ modulation schemes where an optimum bias voltage is at an intermediate point between a NULL point and a PEAK point (a bias point deviated by $V\pi$ from the NULL point). However, the aforementioned control necessitates the superposition of the dither on both the bias voltage and the driving voltage amplitude for performing feedback control, thereby inducing the problem of complicacy of the control circuit.

Further, the techniques disclosed in PTLs 1 and 2 contrive setting the bias voltage at an intermediate point between the PEAK point and the NULL point and, further, setting the driving voltage amplitude to be the half wave voltage ($V\pi$) of the MZ modulator in order to perform control. Accordingly, these techniques are control schemes that are hard to use with CSRZ modulation, BPSK modulation, QPSK modulation or other modulation schemes adapted to set the bias voltage at a NULL point and to use driving voltage amplitudes of about 100% of twice the half wave voltage ($2V\pi$) of an MZ modulator, which realizes most excellent transmission characteristics.

The present invention was made in order to overcome the aforementioned problems and aims at providing an optical modulation device and a method for controlling an optical modulation device that are capable of setting a driving voltage amplitude even with a modulation scheme adapted to superpose a dither at a single position and to set a DC bias at a NULL point.

Solutions to Problems

An optical modulation device of the present invention includes an MZ modulator for modulating light output continuously from a light source, based on a driving voltage and a bias voltage, to generate a light signal; a splitter for splitting the light signal; a photodiode for converting a light signal output from the splitter into an electrical signal; a log detector for detecting a difference between a local maximum value and a local minimum value of the signal output from the photodiode; a dither-signal generator for generating a dither signal during control of a driving voltage amplitude; a synchronous detector for performing synchronous detection by multiplying an output signal from the log detector by the dither signal; a bias controller for outputting a reference DC bias voltage; a superposition circuitry for superposing the dither signal on the reference DC bias voltage and outputting a resultant voltage as the bias voltage during the control of the driving voltage amplitude and for outputting the reference DC bias voltage as the bias voltage during other operations than the control of the driving voltage amplitude; a data-signal generator for generating a data signal and outputting the data signal; a check-pattern generator for outputting a check-pattern signal that is set by a user; a selector for selecting the check-pattern signal during the control of the driving voltage amplitude and for selecting the data signal during a normal operation; an amplifier for amplifying the selected signal and outputting the amplified signal as the driving voltage to the MZ modulator; and an amplitude setter for determining, by varying an amplitude of an output voltage from the amplifier, a plurality of amplitudes of output curves from the synchronous detector, each of which is obtained by varying the reference DC bias voltage output from the bias controller, and for setting an amplification factor of the amplifier, based on an amplitude of the output voltage from the amplifier that corresponds to an amplitude satisfying a predetermined condition, out of the plurality of the amplitudes of the output curves from the synchronous detector, during the control of the driving voltage amplitude.

Advantageous Effects of Invention

According to the present invention, during the control of the driving voltage amplitude, the dither signal is superposed on the reference DC bias voltage and the resultant voltage is output as the bias voltage. Further, by varying the amplitude of the output voltage from the amplifier, a plurality of the amplitudes of the output curves from the synchronous detector are determined, wherein each of the amplitudes of the output curves from the synchronous detector is obtained by varying the reference DC bias voltage. Further, the amplification factor of the amplifier is set, based on the amplitude of the output voltage from the amplifier that corresponds to the amplitude satisfying a predetermined condition, out of the plurality of the amplitudes of the output curves from the synchronous detector. Thus, the amplitude of the driving voltage can be set, even with a modulation scheme adapted to superpose the dither only on the bias voltage and to set the DC bias at the NULL point.

BRIEF DESCRIPTION OF DRAWINGS

FIG. 11 is a flow chart illustrating procedures for setting the driving voltage amplitude to be twice the half wave voltage (2Vπ) of the MZ modulator according to the second embodiment.

DESCRIPTION OF EMBODIMENTS

Figure 1:
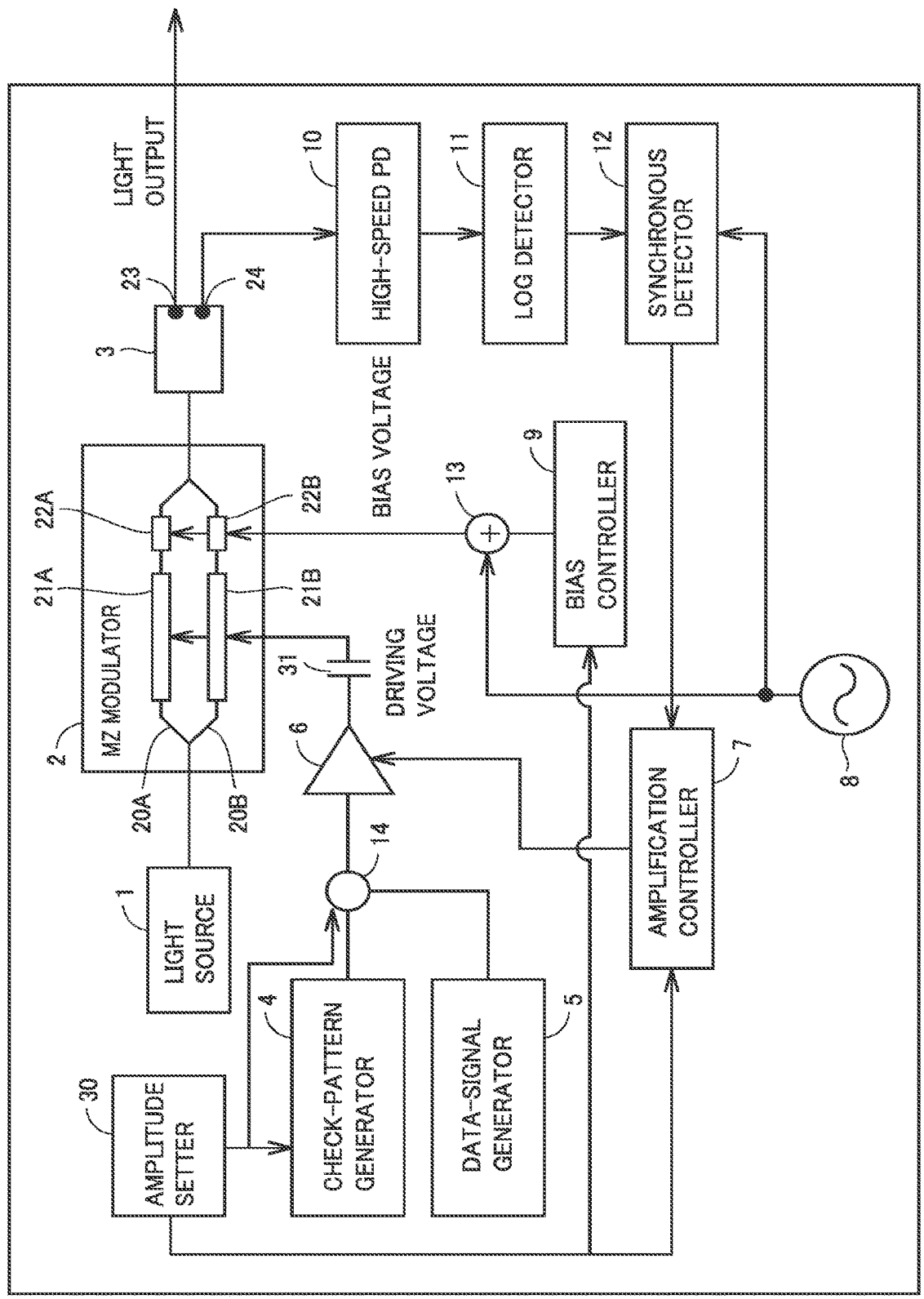
FIG. 1 is a diagram illustrating the structure of an optical modulation device according to a first embodiment.

Hereinafter, respective embodiments of the present invention will be described in detail with reference to the drawings.

Further, the same or corresponding portions will be designated by the same reference characters and will not be described redundantly.

First Embodiment

FIG. 1 is a diagram illustrating the structure of an optical modulation device according to a first embodiment.

Referring to FIG. 1, the optical modulation device includes a light source 1, an MZ modulator 2, a splitter 3, a check-pattern generator 4, a data-signal generator 5, a selector 14, an amplifier 6, an amplification controller 7, a dither-signal generator 8, a high-speed PD (photo diode) 10, a log detector 11, a synchronous detector 12, a bias controller 9, a superposition circuitry 13, selector 14, an amplitude setter 30, and a capacitor 31.

Light source 1 outputs light.

MZ modulator 2 modulates light emitted continuously from light source 1, based on a driving voltage and a bias voltage, to generate a light signal.

MZ modulator 2 is an optical modulator that is formed from, for example, a LN (Lithium Niobate) crystal, a semiconductor such as InP or other materials and is adapted to utilize refractive index changes due to application of electric fields thereto, which is a so-called electro-optical effect. MZ modulator 2 includes a first arm 20A and a second arm 20B as two optical waveguides provided with electrodes, which are connected in parallel with each other between two Y-branching optical waveguides and, thus, MZ modulator 2 is structured as a so-called MZ interferometer. First arm 20A includes a modulation electrode 21A and a phase-difference adjusting electrode 22A. Second arm 20B includes a modulation electrode 21B and a phase-difference adjusting electrode 22B. MZ modulator 2 gives a light intensity change to the light passing through the MZ interferometer, wherein this light intensity change depends on the phase difference between the two optical waveguides, the phase difference occurring due to the refractive index change caused by the driving voltage input to modulation electrodes 21A and 21B and the bias voltage applied to phase-difference adjusting electrodes 22A and 22B. Further, MZ modulator 2 outputs the resultant light. MZ modulator 2 is an optical modulator capable of attaining both rapidity and higher light signal quality such as lower chirping. MZ modulator 2 periodically changes the characteristics of the light output therefrom, with respect to the driving voltage input thereto.

Splitter 3 splits the light output from MZ modulator 2 and outputs the split light to a first output device 23 and a second output device 24. First output device 23 is connected to the outside. Second output device 24 is connected to high-speed PD 10.

Check-pattern generator 4 generates a check-pattern signal and outputs it. The check-pattern signal is a clock signal with a frequency that is half the baud rate of a data signal.

Data-signal generator 5 generates a data signal and outputs the generated data signal. Selector 14 selects the check-pattern signal during control of the driving voltage amplitude. Selector 14 selects the data signal during normal operations.

Amplifier 6 amplifies the signal output from selector 14 and outputs the amplified signal as the driving voltage. Amplification controller 7 controls the amplitude of the output from amplifier 6, namely the amplification factor of amplifier 6.

Dither-signal generator 8 generates a dither signal (low-frequency signal) during control of the driving voltage amplitude.

High-speed PD (photo diode) 10 converts the light signal sent from second output device 24 in splitter 3 into an electrical signal.

Log detector 11 detects the difference between a local maximum value and a local minimum value of the signal output from high-speed PD 10 and outputs a detection signal indicative of the difference.

Log detector 11 is constituted by a commercially-available dedicated IC incorporating a Schottky diode, and the like. Further, in order to detect the difference between a local maximum value and a local minimum value of the signal light, there is a need for a frequency range equal to or higher than that of the signal light. For example, if the signal light is a clock signal with a higher level and a lower level that are alternately repeated, log detector 11 is required to have a frequency range equal to or higher than that of the signal light. Further, if the signal light is a data signal with a higher level and a lower level that are repeated at random, log detector 11 desirably has a frequency range equal to or higher than about 1/10 of that of a highest-frequency component of the signal light. However, in this case, the required frequency range depends on the randomness of the data signal and, therefore, log detector 11 is not necessarily required to have a frequency range equal to or higher than about 1/10 thereof.

Synchronous detector 12 performs synchronous detection by multiplying the detection signal output from log detector 11 by the dither signal output from dither-signal generator 8.

Bias controller 9 outputs a reference DC bias voltage. Bias controller 9 controls the magnitude of the reference DC bias voltage output therefrom.

Superposition circuitry 13 superposes the dither signal (the dither voltage) output from dither-signal generator 8 on the reference DC bias voltage output from bias controller 9 to generate a bias voltage and outputs the generated bias voltage, during control of the driving voltage amplitude. Superposition circuitry 13 outputs the reference DC bias voltage output from bias controller 9 as the bias voltage, during other operations than control of the driving voltage amplitude (during normal operations, and during bias voltage control).

During control of the driving voltage amplitude, amplitude setter 30 obtains the amplitude of output curve from synchronous detector 12 (half of the difference between the maximum value and the minimum value) by varying the reference DC bias voltage output from bias controller 9 and, further, obtains a plurality of these amplitudes of output curves from synchronous detector 12 by varying the amplitude of the voltage output from amplifier 6. Amplitude setter 30 sets the amplification factor of the amplifier 6, based on an amplitude of the output voltage from amplifier 6 that corresponds to an amplitude satisfying predetermined conditions, out of the plurality of the amplitudes of the output curves from synchronous detector 12. More specifically, amplitude setter 30 sets the amplification factor of amplifier 6, based on an amplitude of the output voltage from amplifier 6 that corresponds to an amplitude having the maximum value, out of the plurality of the amplitudes of the output curves from synchronous detector 12, when the optimum driving voltage amplitude corresponds to the half wave voltage (Vπ) of MZ modulator 2.

Next, operations according to the first embodiment will be described. Light from light source 1 is incident to MZ modulator 2. Amplifier 6 amplifies the driving voltage to MZ modulator 2.

Splitter 3 splits the light signal output from MZ modulator 2.

High-speed PD 10 converts the light signal output from splitter 3 into an electric signal and outputs the electric signal to log detector 11.

Log detector 11 detects the difference D between a local maximum value and a local minimum value of the signal output from high-speed PD 10 and outputs a detection signal indicative of the difference D to synchronous detector 12.

Synchronous detector 12 performs synchronous detection, using the dither signal generated from dither-signal generator 8 and the detection signal indicative of the difference D that is output from log detector 11. The result of the synchronous detection is output to amplification controller 7, as an error signal indicative of an error with respect to a PEAK point or a NULL point of the DC bias.

Amplification controller 7 controls the output from amplifier 6, based on the error signal. Amplitude setter 30 causes amplification controller 7 to control the amplification factor of amplifier 6 such that the output from amplifier 6 is constant and, further, amplitude setter 30 causes bias controller 9 to vary the reference DC bias voltage applied to MZ modulator 2, in order to acquire the output value from synchronous detector 12 as the error signal. At this time, the width of the variation of the reference DC bias voltage is required to be equal to or more than the half wave voltage (Vπ) of MZ modulator 2. The principle of the control will be described in detail, with reference to FIGS. 3 to 5.

Figure 2:
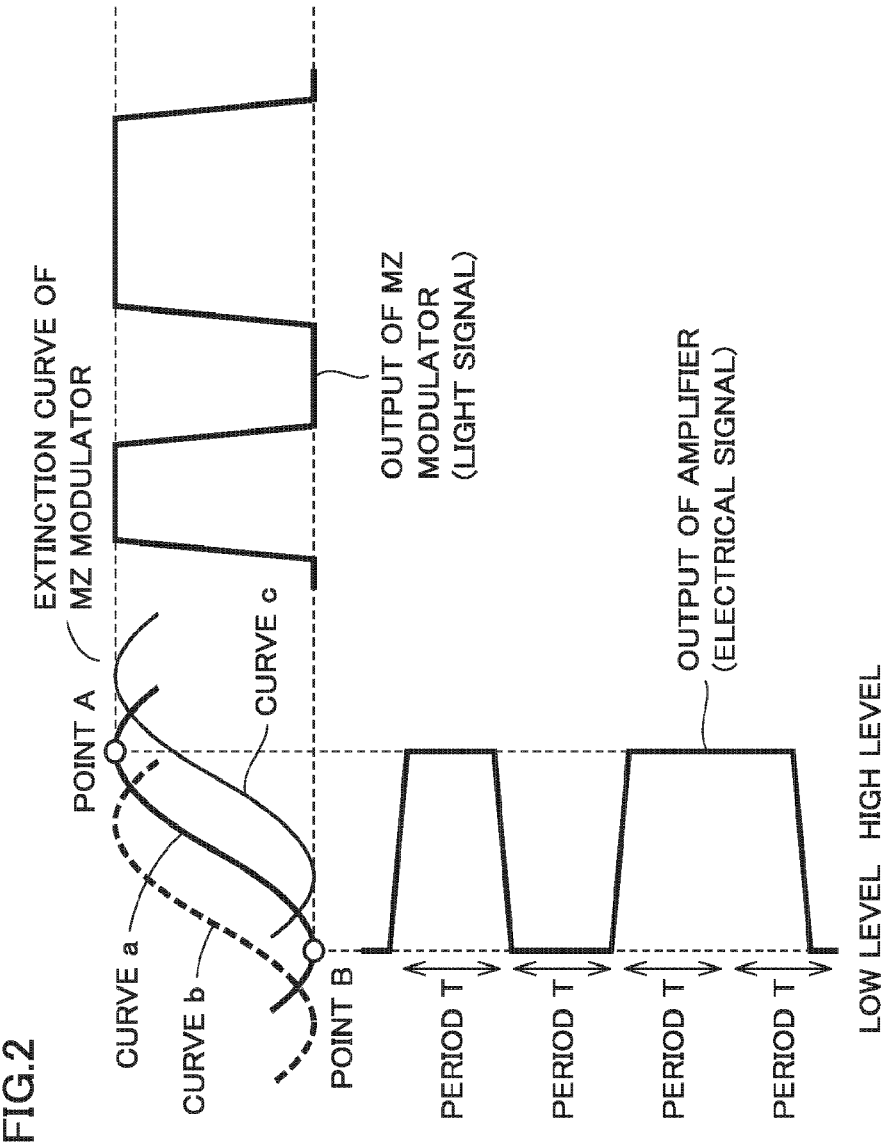
FIG. 2 is a diagram illustrating an example of a light output characteristic of an MZ modulator with respect to a driving voltage.

FIG. 2 is a diagram illustrating an example of the light output characteristic with respect to the driving voltage to MZ modulator 2.

Referring to FIG. 2, in cases of NRZ (Non Return to Zero) modulation codes, ON/OFF modulation for the light output is performed by making a high level and a low level of the driving voltage, which can be varied in level at a period T, respectively coincident with an apex A of light emission and an apex B of light extinction in the light output characteristic.

Further, in the following description, the difference between the voltages corresponding to the apexes A/B of light emission/light extinction in the light output characteristic, which is periodically varied, will be referred to as the half wave voltage (Vπ) of MZ modulator 2. In this case, the optimum amplitude of the driving voltage for the NRZ modulation scheme is the half wave voltage (Vπ).

MZ modulator 2 has the advantage of less chirping, but has induced the problem of occurrences of inter-code interference in the ON/OFF levels of the light output, since the light output characteristic with respect to the driving voltage is temporally drifted toward a curve b or a curve c from a curve a in FIG. 2 due to temperature changes, temporal changes or the like. In order to overcome this problem for stably controlling the operating point in MZ modulator 2, it is necessary to vary the bias voltage applied to phase-difference adjusting electrodes 22A and 22B depending on the variation of the curve regarding the light output characteristic with respect to the driving voltage for controlling the operating points.

Hereinafter, there will be described the control of the driving voltage amplitude in a modulation scheme, such as BPSK and CSRZ, where the optimum driving voltage amplitude is twice the half wave voltage (2Vπ).

Figure 3:
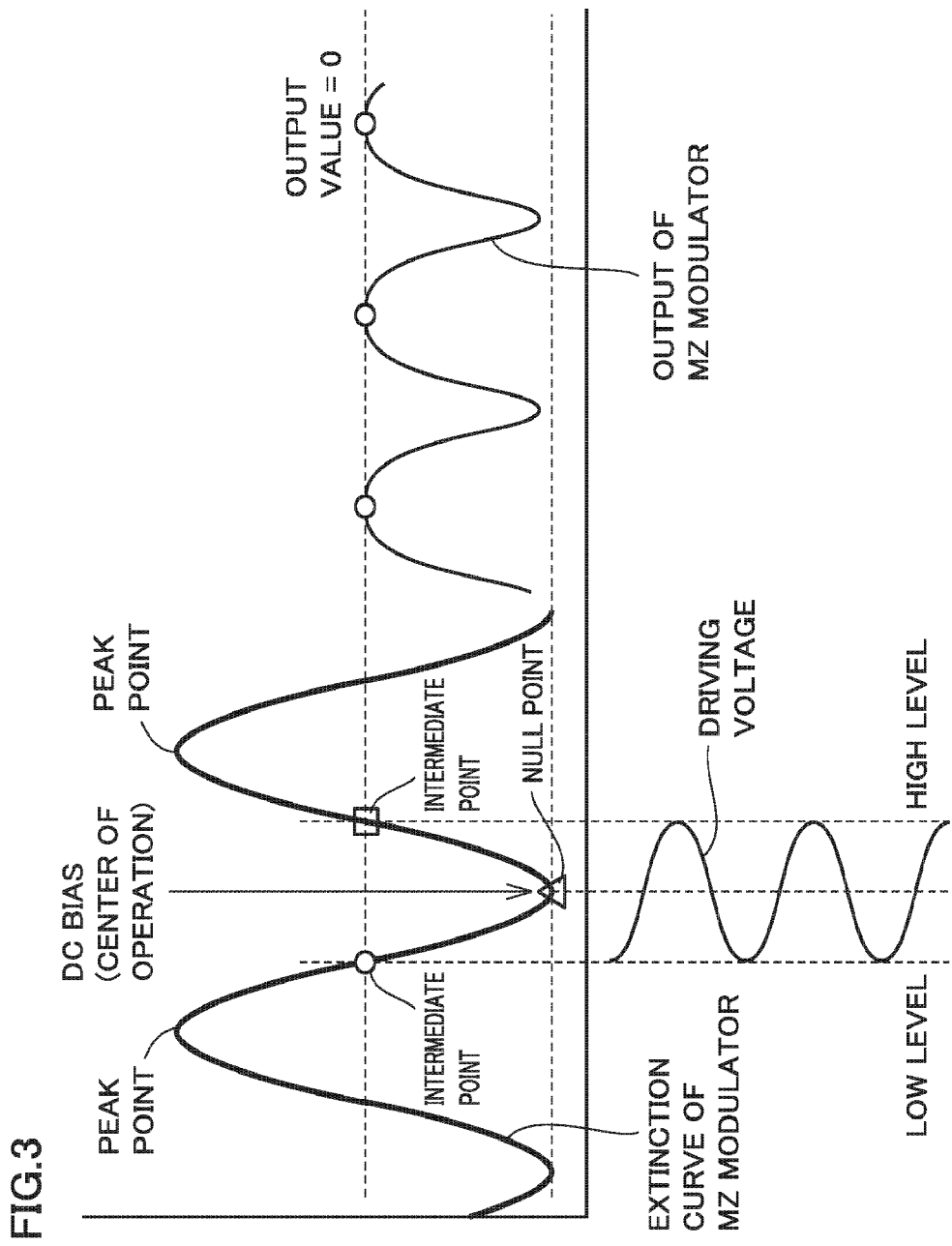
FIG. 3 is a diagram illustrating the relationship between the light output and the driving voltage, regarding an extinction curve in a case where a bias point is at a NULL point on the extinction curve.
Figure 4:
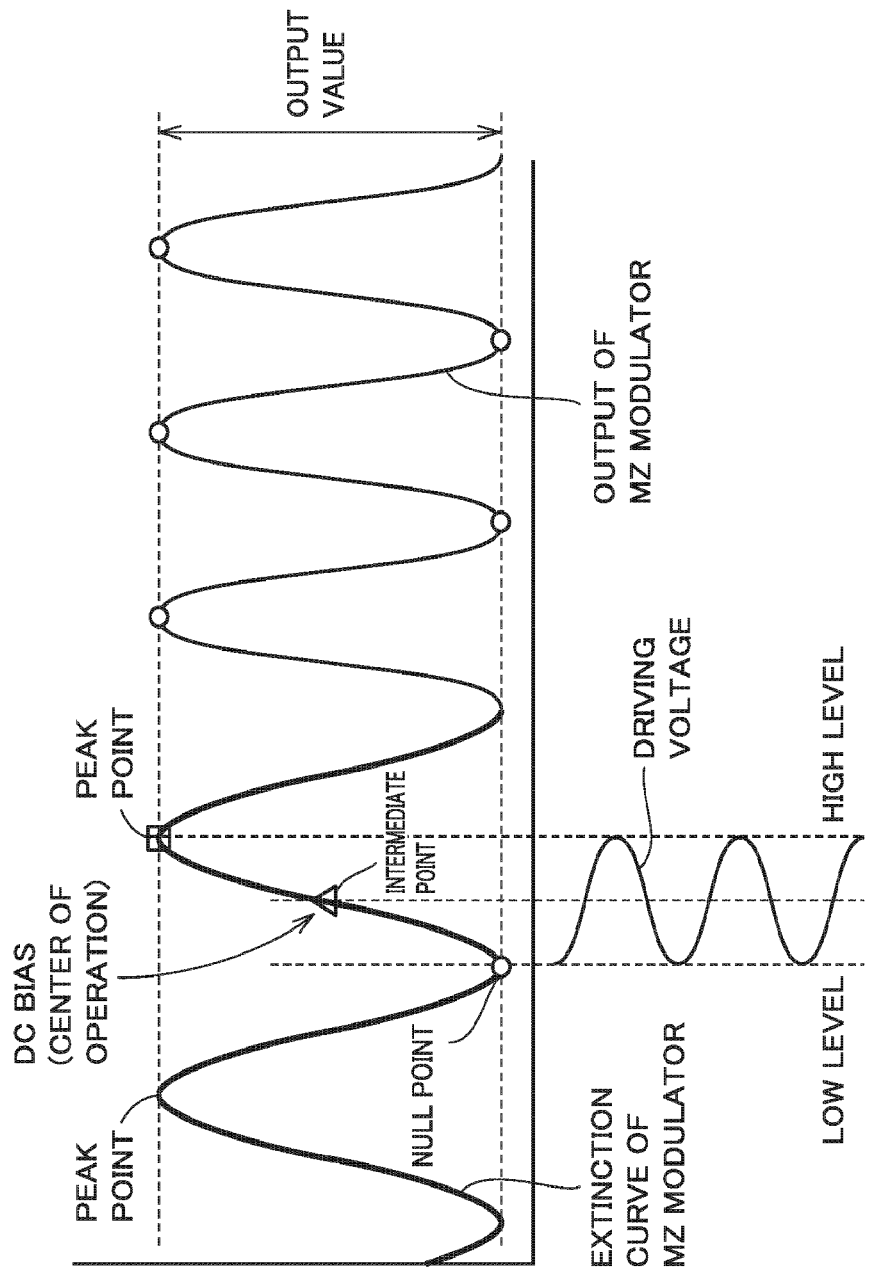
FIG. 4 is a diagram illustrating the relationship between the light output and the driving voltage, regarding an extinction curve in a case where the bias point is at an intermediate value between a PEAK point and the NULL point on the extinction curve.
Figure 5:
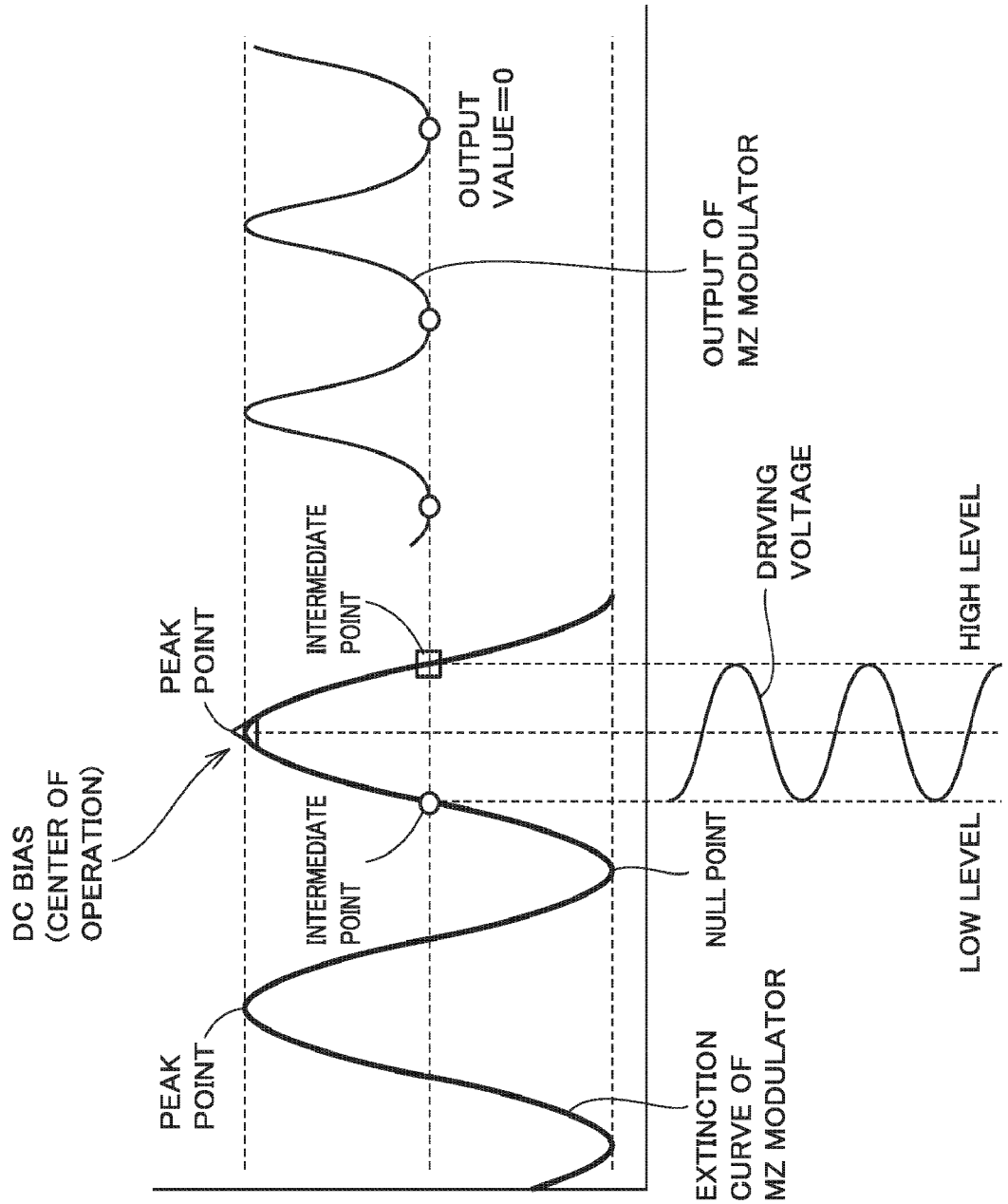
FIG. 5 is a diagram illustrating the relationship between the light output and the driving voltage, regarding an extinction curve in a case where the bias point is at the PEAK point on the extinction curve.

With reference to FIGS. 3 to 5, there will be described the relationship between the driving voltage and the light output, regarding the extinction curve in MZ modulator 2.

In these figures, there is illustrated an extinction curve in the left side, wherein the lateral axis represents the voltage input to MZ modulator 2, namely the sum of the bias voltage and the driving voltage, while the vertical axis represents the intensity of the output light from MZ modulator 2. There is also illustrated a curve in the right side, wherein the lateral axis represents time, while the vertical axis represents the intensity of the output light from MZ modulator 2.

The difference between the voltage that causes the output light to be at an ON level (PEAK of the extinction curve) and the voltage that causes the output light to be at an OFF level (NULL of the extinction curve) is referred to as the half wave voltage (Vπ) of MZ modulator 2.

At first, there will be described operations in a case where the driving voltage amplitude is an amplitude that corresponds to the half wave voltage (Vπ) of MZ modulator 2. In this case, the driving voltage is a clock signal. In FIGS. 3 to 5, a round mark represents a point on the extinction curve when the driving voltage is at a low level, a rectangular mark represents a point on the extinction curve when the driving voltage is at a high level, and a triangular mark represents a point on the extinction curve when the driving voltage is at a middle level.

FIG. 3 is a diagram illustrating the relationship between the light output and the driving voltage, regarding the extinction curve in a case where the bias point is at the NULL point on the extinction curve.

In cases of CSRZ, BPSK or other modulation schemes, the optimum bias is at the NULL point. Since the driving voltage amplitude is Vπ, the light output has an intermediate value between the PEAK point and the NULL point on the extinction curve, when the driving voltage is at the low level. Further, when the driving voltage is the high level, similarly, the light output has an intermediate value between the PEAK point and the NULL point on the extinction curve. In this case, in view of the operation speed, it is hard to sense the power during the transition of the driving voltage between the high level and the low level with log detector 11. That is, since the local maximum value and the local minimum value of the output light are both at an intermediate level between the PEAK point and the NULL point on the extinction curve, log detector 11 outputs zero.

FIG. 4 is a diagram illustrating the relationship between the light output and the driving voltage, regarding the extinction curve in a case where the bias point is at an intermediate value between the PEAK point and the NULL point on the extinction curve.

Since the driving voltage amplitude is Vπ, the light output is at the NULL point on the extinction curve, when the driving voltage is at the low level. Further, when the driving voltage is at the high level, the light output is at the PEAK point on the extinction curve. Therefore, the output from log detector 11 is equal to the difference between the PEAK point and the NULL on the extinction curve.

FIG. 5 is a diagram illustrating the relationship between the light output and the driving voltage, regarding the extinction curve in a case where the bias point is at the PEAK point on the extinction curve.

In cases of RZ modulation with a duty ratio of 33% or other modulation schemes, the optimum bias is at this bias point. Since the driving voltage amplitude is Vπ, the light output has an intermediate value between the PEAK point and the NULL point on the extinction curve, when the driving voltage is at the low level. Further, when the driving voltage is at the high level, similarly, the light output has an intermediate value between the PEAK point and the NULL point on the extinction curve. In this case, in view of the operation speed, it is hard to sense the power during the transition of the driving voltage between the high level and the low level with log detector 11. That is, since the local maximum value and the local minimum value of the output light are both at the intermediate level between the PEAK point and the NULL point on the extinction curve, log detector 11 outputs zero.

On the other hand, in cases where the driving voltage amplitude is twice the half wave voltage of MZ modulator 2 (2Vπ), regardless of the position of the bias point, when the driving voltage is at the low level, the output light is at the same level as that of when the driving voltage is at the high level and, therefore, log detector 11 outputs zero. Similarly, in cases where the driving voltage amplitude is zero, regardless of the position of the bias point, when the driving voltage is at the low level, the output light is at the same level as that of when the driving voltage is at the high level and, therefore, log detector 11 outputs zero.

As described above, the output from log detector 11 is varied, depending on the bias point and the driving voltage amplitude.

Figure 6:
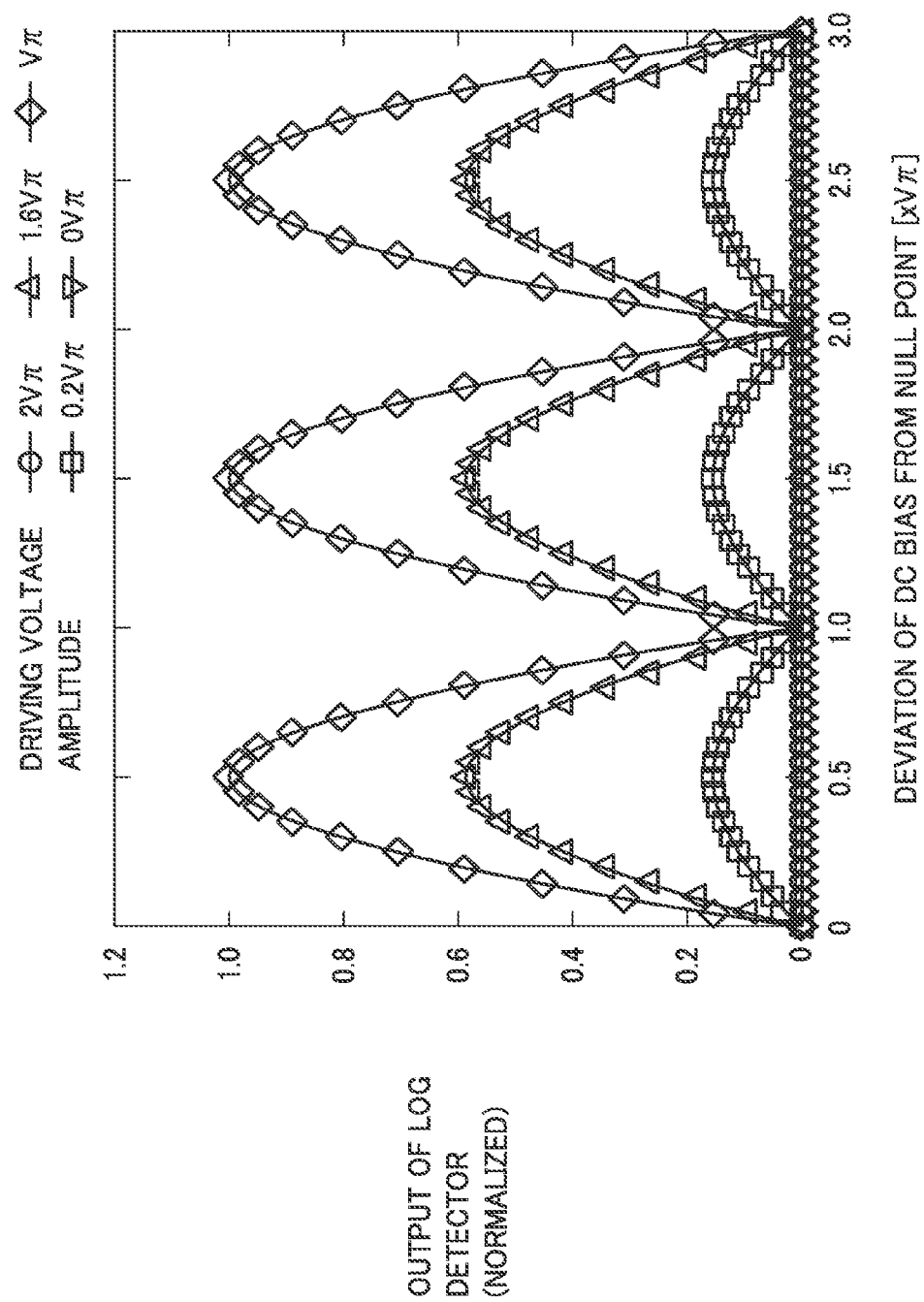
FIG. 6 is a diagram illustrating the output from a log detector (the difference between a local maximum value and a local minimum value of the output light) with respect to the deviation of the bias point from the NULL point, for each driving voltage amplitude.

FIG. 6 is a diagram illustrating the output from log detector 11 (the difference between the local maximum value and the local minimum value of the output light) with respect to the deviation of the bias point from the NULL point, for each driving voltage amplitude.

In the case where the driving voltage amplitude is Vπ, the output from log detector 11 has a smaller value as the bias point is made closer to the NULL point, and the output from log detector 11 has a larger value as the bias point is made closer to 0.5×Vπ (which corresponds to FIG. 4) and the output from log detector 11 has a smaller value as the bias point is made closer to 1×Vπ (which corresponds to FIG. 5). Since the extinction curve has periodicity, the output from log detector 11 also has periodicity.

When the driving voltage amplitude is 2Vπ or 0, the output from log detector 11 has a constant value (=0) with respect to the bias deviation from the NULL point as described above.

When the driving voltage amplitude is others (0.2Vπ, 1.6Vπ), the output from log detector 11 exhibits the same behavior as that of when the driving voltage amplitude is Vπ. That is, the output from log detector 11 has a smaller value as the bias point is made closer to the NULL point. Further, the output from log detector 11 has a larger value as the bias point is made closer to 0.5×Vπ, and the output from log detector 11 has a smaller value as the bias point is made closer to 1×Vπ. Further, as the driving voltage amplitude is made closer to Vπ, the output from log detector 11 is made larger. As the driving voltage amplitude is made closer to 2Vπ or 0, the output from log detector 11 is made smaller.

In the present embodiment, the dither signal generated by dither-signal generator 8 is added to the bias. Namely, the bias point is varied at a lower frequency. Therefore, for example, in the state in FIG. 3, the state where "the bias point is at the NULL point" means that "the center of the bias point is at the NULL point", in actual. Here, it is assumed that the frequency of the dither signal is f [Hz].

Figure 7:
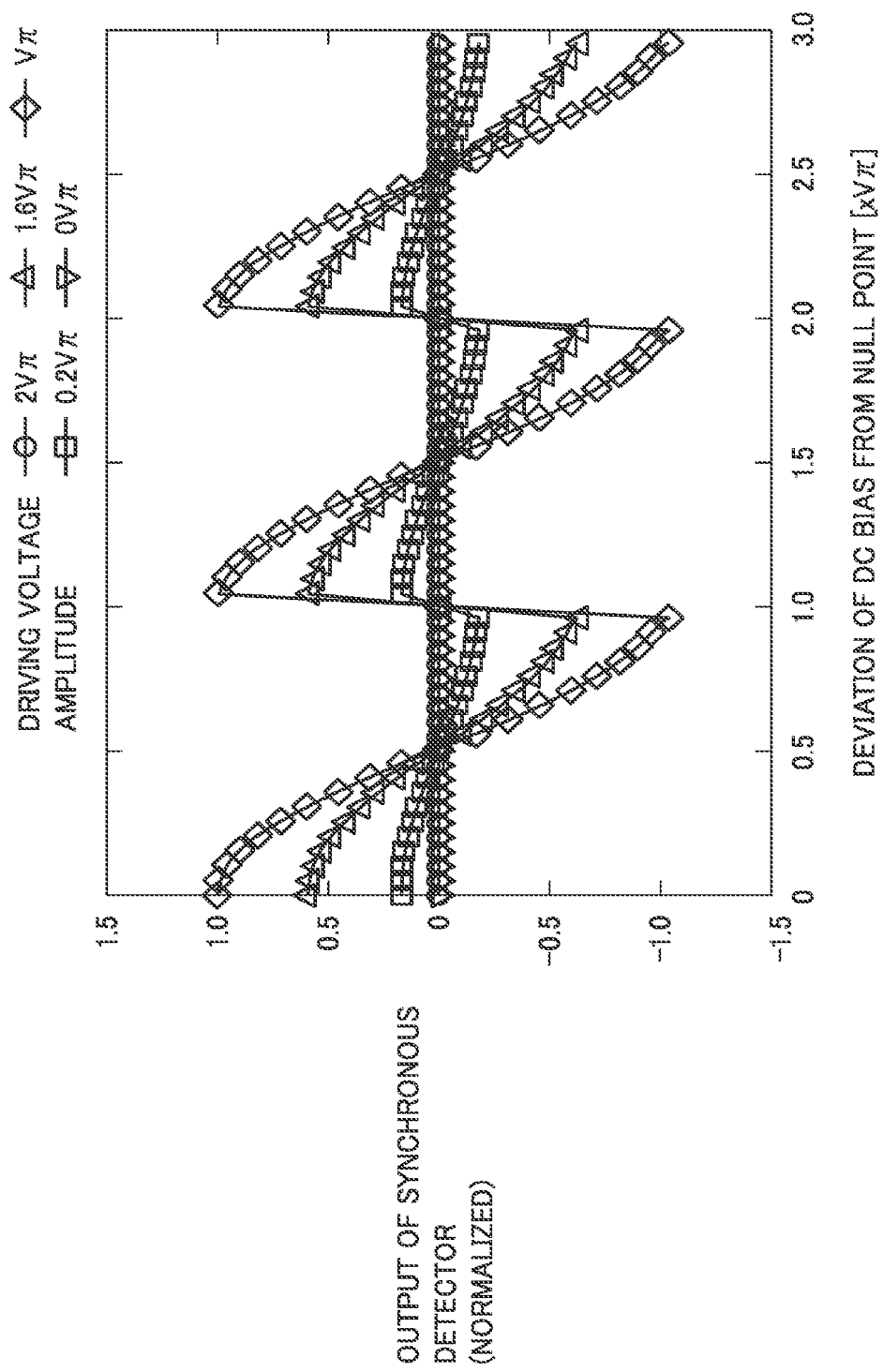
FIG. 7 is a diagram illustrating the output value from a synchronous detector with respect to the deviation of the center of the bias point from the NULL point, for each driving voltage amplitude.

FIG. 7 is a diagram illustrating the output value from synchronous detector 12 with respect to the deviation of the center of the bias point from the NULL point, for each driving voltage amplitude.

There will be described the output from synchronous detector 12 when the driving voltage amplitude is other than 2Vπ and 0.

When the center of the bias point is at the NULL point, namely in the state of FIG. 3, the output from log detector 11 is varied by the dither signal, and the frequency thereof is 2f [Hz]. This can be also understood from FIG. 6. In this case, log detector 11 outputs a local minimum value and, therefore, the output from log detector 11 is varied for two periods, with respect to a single period of the dither signal. Accordingly, since synchronous detector 12 performs synchronous detection using the output signal with a frequency of 2f [Hz] that is output from log detector 11 and the dither signal with a frequency of f[Hz] that is output from dither-signal generator 8, synchronous detector 12 outputs zero. Further, referring to FIG. 7, the output from synchronous detector 12 abruptly rises since the center of the bias point is deviated from the NULL point and, therefore, there is not illustrated the fact that the output from synchronous detector 12 is "zero" when the center of the bias point is at the NULL point.

When the center of the bias point is deviated by 0.5×Vπ from the NULL point, namely in the state of FIG. 4, the output from log detector 11 is also varied by the dither signal, and the frequency thereof is 2f [Hz]. This can be also understood from FIG. 6. In this case, log detector 11 outputs a local maximum value and, therefore, the output from log detector 11 is varied for two periods with respect to a single period of the dither signal. Accordingly, since synchronous detector 12 performs synchronous detection using the output signal with a frequency of 2f [Hz] that is output from log detector 11 and the dither signal with a frequency of f[Hz] that is output from dither-signal generator 8, synchronous detector 12 outputs zero.

Further, when the center of the bias point is deviated by 0.25×Vπ from the NULL point, the output from log detector 11 is also varied by the dither signal, and the frequency thereof is f [Hz]. This can be also understood from FIG. 6. This is because of the following. That is, when the center of the bias point is deviated by 0.25×Vπ from the NULL point, log detector 11 outputs an intermediate value between the local maximum value and the local minimum value and, therefore, the variation of the dither signal for a single period, as it stands, causes the variation of the output from log detector 11. Accordingly, since synchronous detector 12 performs synchronous detection using the output signal with a frequency of f [Hz] that is output from log detector 11 and the dither signal with a frequency of f[Hz] that is output from dither-signal generator 8, synchronous detector 12 outputs a positive value.

Further, when the center of the bias point is deviated by 0.75×Vπ from the NULL point, the output from log detector 11 is also varied by the dither signal, and the frequency thereof is f [Hz]. However, in this case, the output signal from log detector 11 is a signal with a frequency of f [Hz] and with a phase shifted by 180 degrees from that of when the center of the bias point is deviated by 0.25×Vπ from the NULL point. This can be also understood from FIG. 6. When the center of the bias point is deviated by 0.25×Vπ from the NULL point, log detector 11 outputs an intermediate value between the local maximum value and the local minimum value and the output thereof has a positive slope. On the other hand, when the center of the bias point is deviated by 0.75×Vπ from the NULL point, log detector 11 outputs an intermediate value between the local maximum value and the local minimum value and the output thereof has a negative slope. Accordingly, although synchronous detector 12 performs synchronous detection using the output signal with a frequency of f [Hz] that is output from the log detector 11 and the dither signal with a frequency of f [Hz] that is output from the dither-signal generator 8, since they are deviated in phase by 180 degrees from each other, synchronous detector 12 outputs a negative value.

As described above, the output value from synchronous detector 12 is varied depending on the center of the bias point.

Figure 8:
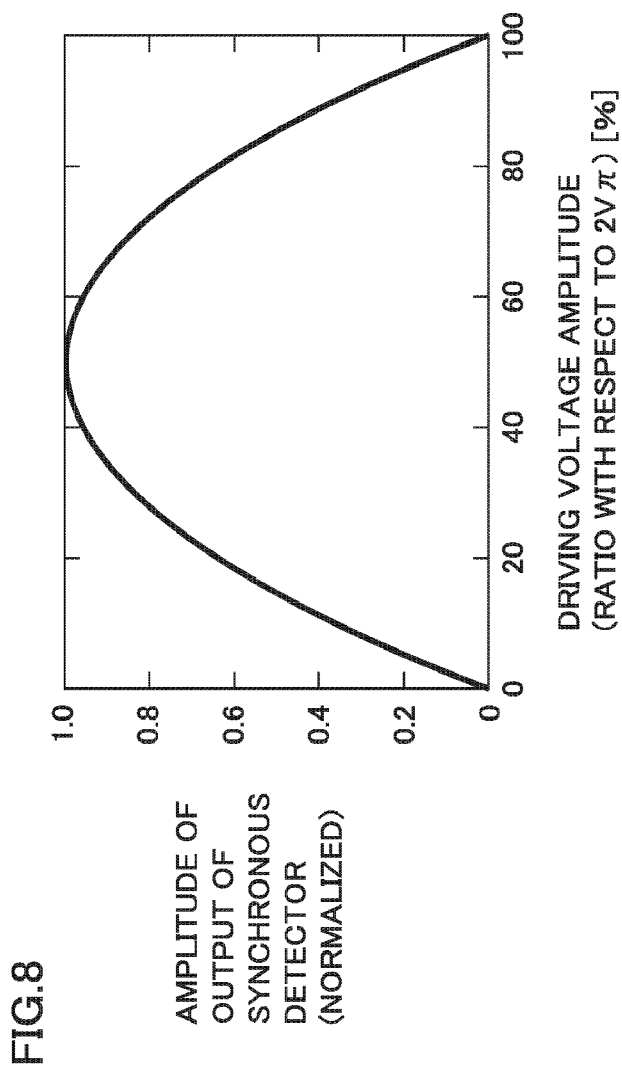
FIG. 8 is a diagram illustrating the amplitude of the output curve from the synchronous detector with respect to the driving voltage amplitude.

FIG. 8 is a diagram illustrating the amplitude of the output curve from synchronous detector 12 with respect to the driving voltage amplitude. As illustrated in FIG. 8, when the driving voltage amplitude is zero, the amplitude of the output curve from synchronous detector 12 is zero. The amplitude of the output curve from synchronous detector 12 is increased as the driving voltage amplitude is increased. When the driving voltage amplitude is 50% of 2Vπ, namely Vπ, the amplitude of the output curve from synchronous detector 12 is maximized. The amplitude of the output curve from synchronous detector 12 is decreased as the driving voltage amplitude is further increased from Vπ. When the driving voltage amplitude is 2Vπ, the amplitude of the output curve from synchronous detector 12 is zero.

Next, there will be described procedures for setting the driving voltage amplitude to be the half wave voltage (Vπ) of MZ modulator 2, using the aforementioned principle. The following description is merely illustrative. It is required only to acquire the amplitude of the output voltage from amplifier 6 when the amplitude of the output curve from synchronous detector 12 is maximized, by making comparison between the amplitudes of the respective output curves from synchronous detector 12 that are each obtained by varying the reference DC bias by Vπ or more and are obtained by setting the respective amplitudes of the output voltage from amplifier 6. The amplitude of the output voltage from amplifier 6 at this time corresponds to the half wave voltage (Vπ) of MZ modulator 2.

Figure 9:
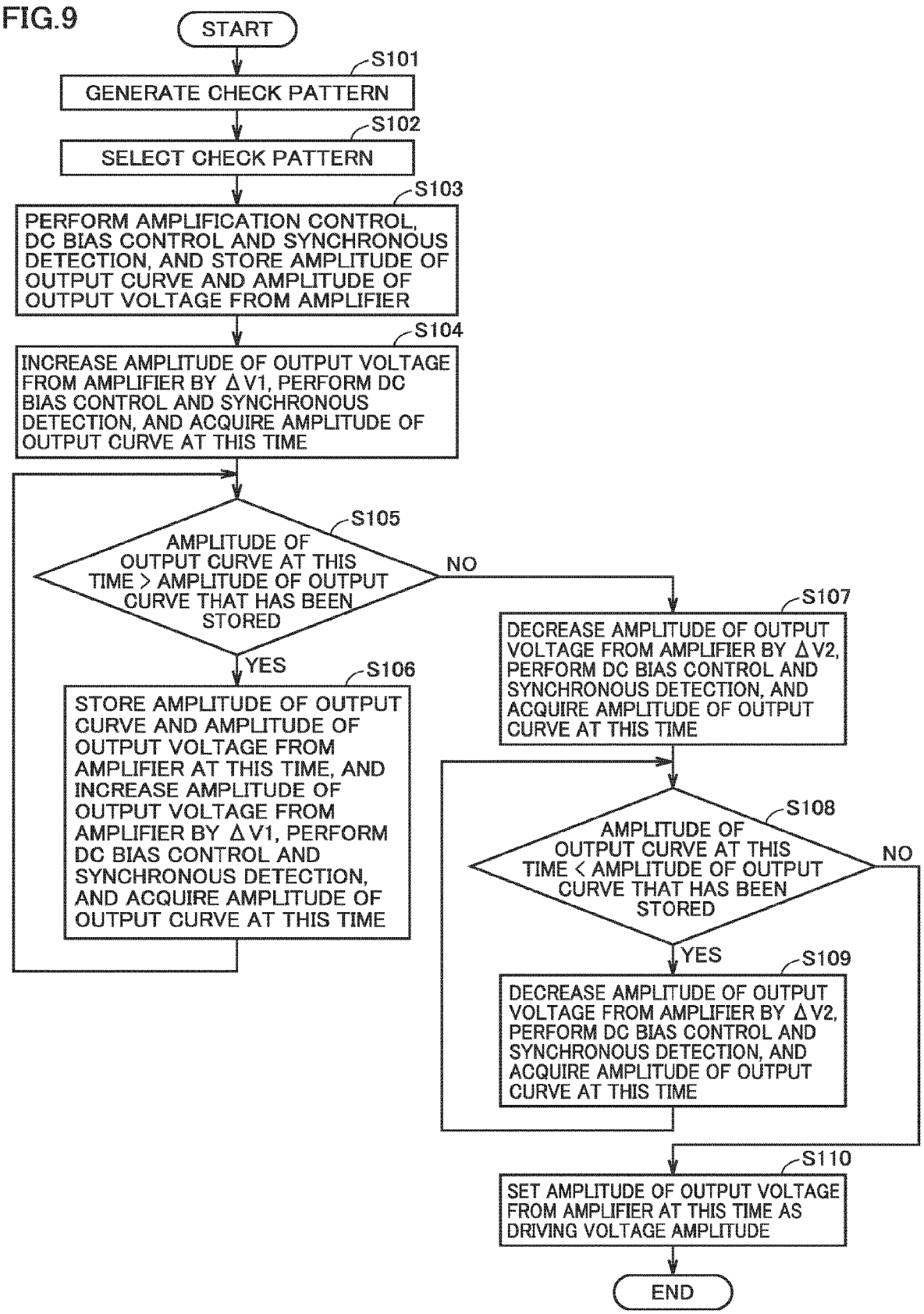
FIG. 9 is a flow chart illustrating procedures for setting the driving voltage amplitude to be the half wave voltage (Vπ) of the MZ modulator according to the first embodiment.

FIG. 9 is a flow chart illustrating procedures for setting the driving voltage amplitude to be the half wave voltage (Vπ) of MZ modulator 2 according to the first embodiment.

In step S101, amplitude setter 30 sets a clock with a frequency that is half the baud rate of a data signal to be actually used, as a check-pattern signal output from check-pattern generator 4.

In step S102, amplitude setter 30 controls selector 14 such that only the output from check-pattern generator 4 is input to amplifier 6.

In step S103, in a state where light from light source 1 is input to MZ modulator 2, amplitude setter 30 controls amplification controller 7 such that the output from amplifier 6 has an appropriate magnitude. At this time, such an appropriate output value has a magnitude that is equal to or more than zero but does not destroy MZ modulator 2. In this state, amplitude setter 30 causes bias controller 9 to vary the reference DC bias by Vπ or more, while causing synchronous detector 12 to perform synchronous detection. Amplitude setter 30 acquires the output curve from synchronous detector 12 and stores the amplitude of the output curve from synchronous detector 12 and the amplitude of the output voltage from amplifier 6.

In step S104, amplitude setter 30 controls amplification controller 7 such that the amplitude of the output voltage from amplifier 6 is increased by a predetermined amount ΔV1. Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12.

In step S105, if the amplitude of the output curve from synchronous detector 12 at this time is larger than the amplitude of the output curve from synchronous detector 12 that has been stored, the processing proceeds to step S106. If the amplitude of the output curve from synchronous detector 12 at this time is equal to or smaller than the amplitude of the output curve from synchronous detector 12 that has been stored, the processing proceeds to step S107.

In step S106, amplitude setter 30 stores the amplitude of the output curve from synchronous detector 12 and the amplitude of the output voltage from amplifier 6 at this time. Further, amplitude setter 30 controls amplification controller 7 such that the amplitude of the output voltage from amplifier 6 is increased by a predetermined amount ΔV1. Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12. Thereafter, the processing returns to step S105.

In step S107, while the amplitude of the output curve from synchronous detector 12 and the amplitude of the output voltage from amplifier 6 that have been stored are kept stored, amplitude setter 30 controls amplification controller 7 such that the amplitude of the output voltage from amplifier 6 is decreased by a predetermined amount ΔV2 (<ΔV1). Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12.

In step S108, if the amplitude of the output curve from synchronous detector 12 at this time is smaller than the amplitude of the output curve from synchronous detector 12 that has been stored, the processing proceeds to step S109. If the amplitude of the output curve from synchronous detector 12 at this time is equal to or larger than the amplitude of the output curve from synchronous detector 12 that has been stored, the processing proceeds to step S110.

In step S109, while the amplitude of the output curve from synchronous detector 12 and the amplitude of the output voltage from amplifier 6 that have been stored are kept stored, amplitude setter 30 controls amplification controller 7 such that the amplitude of the output voltage from amplifier 6 is decreased by a predetermined amount ΔV2 (<ΔV1). Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12. Thereafter, the processing returns to step S108.

In step S110, amplitude setter 30 sets the amplitude of the output voltage from amplifier 6 at this time as the driving voltage amplitude, by regarding the amplitude of the output voltage from amplifier 6 at this time, as the amplitude of the output voltage from amplifier 6 that maximizes the amplitude of the output curve from synchronous detector 12 as in FIG. 8. The driving voltage amplitude set at this time corresponds to the half wave voltage (Vπ) of MZ modulator 2.

By setting ΔV1 and ΔV2 to be appropriate values, the resultant driving voltage amplitude is made to have a value closer to the amplitude of the output voltage from amplifier 6 that maximizes the amplitude of the output curve from synchronous detector 12 as in FIG. 8.

In this case, ΔV1 can be set to be ⅒ of the half wave voltage (Vπ), when the half wave voltage (Vπ) of MZ modulator 2 has been known. Even when Vπ has not been known, if MZ modulator 2 is commercially purchased one, it is possible to provide a value of Vπ that corresponds to a driving voltage amplitude with a lower frequency of about 2 GHz and, therefore, ΔV1 can be set to be ⅒ of this Vπ. If the calculation accuracy is required to be increased, ΔV1 can be made smaller than ⅒ of Vπ. Further, ΔV2 can be set to be ⅒ of ΔV1, for example.

On the other hand, there will be described the bias control for setting the value of the reference DC bias that is output from bias controller 9, with reference to FIGS. 3 to 5.

During the bias control, bias controller 9 stops the generation of a check pattern by check-pattern generator 4, the generation of a data signal by data-signal generator 5, and the generation of a dither signal by dither-signal generator 8. Further, bias controller 9 varies the magnitude of the reference DC bias voltage, while superposition circuitry 13 supplies the reference bias voltage as the bias voltage to MZ modulator 2, thereby obtaining output light from MZ modulator 2. As illustrated in FIG. 3, when the optimum bias point is at the NULL point on the extinction curve, bias controller 9 determines the reference bias voltage that causes the output light intensity to be at the NULL point, as the reference bias voltage output from bias controller 9. As illustrated in FIG. 4, when the optimum bias point is at an intermediate value between the PEAK point and the NULL point on the extinction curve, bias controller 9 determines the reference bias voltage that causes the output light intensity to be at the intermediate value, as the reference bias voltage output from bias controller 9. As illustrated in FIG. 5, when the optimum bias point is at the PEAK point on the extinction curve, bias controller 9 determines the reference bias voltage that causes the output light intensity to be at the PEAK point, as the reference bias voltage output from bias controller 9.

During normal operations, amplitude setter 30 drives MZ modulator 2 using data signals, based on the driving voltage amplitude (the half wave voltage (Vπ)) and the reference bias voltage that have been set. Amplitude setter 30 controls selector 14 to change over the source of signals to be input to amplifier 6, from check-pattern generator 4 to data-signal generator 5. Further, the generation of a dither signal by dither-signal generator 8 is stopped, and the magnitude of the reference bias voltage output from bias controller 9 is set to be the determined magnitude. Further, superposition circuitry 13 supplies the reference bias voltage as the bias voltage to MZ modulator 2. Thereafter, amplitude setter 30 causes amplification controller 7 to control the amplification factor of amplifier 6, such that the output amplitude of the data signal from amplifier 6 is the resultant driving voltage amplitude (the half wave voltage (Vπ)). In this case, the data signal may be of various types depending on the circuit designing, such as a random signal with simple "1" and "0" levels or a signal having been subjected to Nyquist filtering. Further, the amplitude of the output voltage from amplifier 6 is also determined based on the aforementioned calculated Vπ, according to the circuit designing or the sensitivity of the bias control system for MZ modulator 2.

Second Embodiment

A second embodiment relates to a method for setting the driving voltage amplitude to be twice the half wave voltage of MZ modulator 2 (2Vπ). An optical modulation device according to the second embodiment has the same structure as the structure in FIG. 1 and, therefore, will not be described redundantly.

Amplitude setter 30 sets the amplification factor of amplifier 6, based on an amplitude of the output voltage from amplifier 6 that corresponds to an amplitude having a minimum value, out of a plurality of the amplitudes of the output curves from synchronous detector 12, when the optimum driving voltage amplitude is twice the half wave voltage (2Vπ) of MZ modulator 2.

A method for setting the amplification factor will be described in detail as follows, for example.

Every time the amplitude of the output voltage from amplifier 6 has been increased, synchronous detector 12 is caused to perform synchronous detection, and the amplitude of the output curve from synchronous detector 12 is acquired. Thus, as illustrated in FIG. 8, the amplitude of the output curve from synchronous detector 12 is gradually increased as the amplitude of the output voltage from amplifier 6 is increased, and the amplitude of the output curve from synchronous detector 12 is decreased after the amplitude of the output voltage from amplifier 6 reaches the half wave voltage (Vπ) of MZ modulator 2. At this state, if the amplitude of the output curve from synchronous detector 12 is continuously acquired while the amplitude of the output voltage from amplifier 6 is increased, the value of the amplitude of the output curve from synchronous detector 12 comes to zero. This amplitude of the output voltage from amplifier 6 that causes the amplitude of the output curve from synchronous detector 12 to have a value of zero is equal to twice the half wave voltage (2Vπ) of MZ modulator 2. However, it is hard to find the position at that the value of the amplitude of the output curve from synchronous detector 12 comes to just zero. Therefore, procedures that will be described later are executed, in actual.

Figure 10:
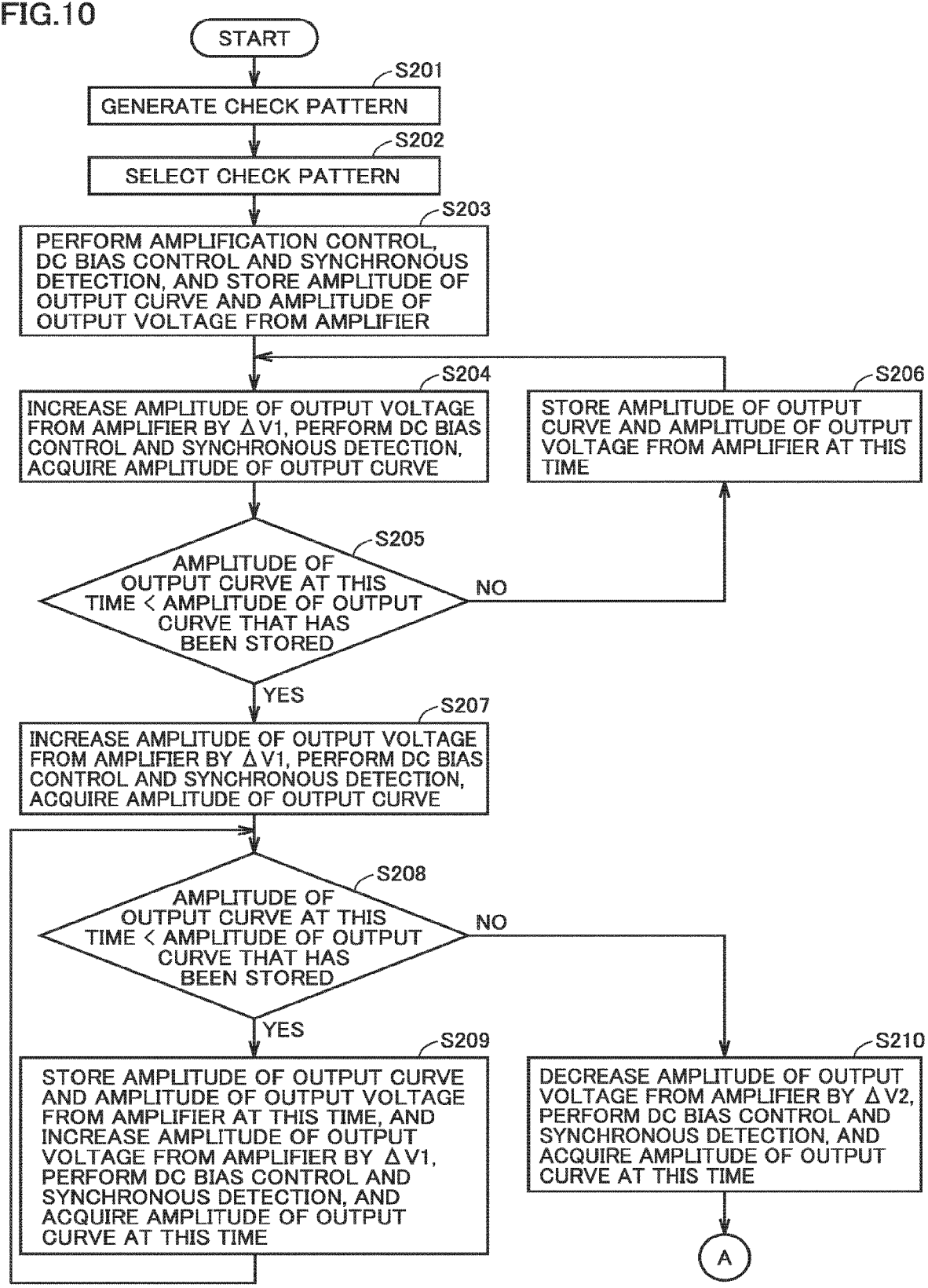
FIG. 10 is a flow chart illustrating procedures for setting the driving voltage amplitude to be twice the half wave voltage (2Vπ) of the MZ modulator according to a second embodiment.

FIGS. 10 and 11 are a flow chart illustrating procedures for setting the driving voltage amplitude to be twice the half wave voltage (2Vπ) of MZ modulator 2 according to the second embodiment.

In step S201, amplitude setter 30 sets a clock with a frequency that is half the baud rate of a data signal to be actually used, as a check-pattern signal output from check-pattern generator 4.

In step S202, amplitude setter 30 controls selector 14 such that only the output from check-pattern generator 4 is input to amplifier 6.

In step S203, in a state where light from light source 1 is input to MZ modulator 2, amplitude setter 30 controls amplification controller 7 such that the output from amplifier 6 has an appropriate magnitude. At this time, such an appropriate output value has a magnitude that is equal to or more than zero but does not destroy MZ modulator 2. In this state, amplitude setter 30 causes bias controller 9 to vary the reference DC bias by Vπ or more, while causing synchronous detector 12 to perform synchronous detection. Amplitude setter 30 acquires the output curve from synchronous detector 12 and stores the amplitude of the output curve from synchronous detector 12 and the amplitude of the output voltage from amplifier 6.

In step S204, amplitude setter 30 controls amplification controller 7 such that the amplitude of the output voltage from amplifier 6 is increased by a predetermined amount ΔV1. Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12.

In step S205, if the amplitude of the output curve from synchronous detector 12 at this time is smaller than the amplitude of the output curve from synchronous detector 12 that has been stored, it is determined that the amplitude of the output voltage from amplifier 6 has exceeded the half wave voltage (Vπ) of MZ modulator 2, and the processing proceeds to step S207. If the amplitude of the output curve from synchronous detector 12 at this time is equal to or larger than the amplitude of the output curve from synchronous detector 12 that has been stored, it is determined that the amplitude of the output voltage from amplifier 6 has not exceeded the half wave voltage (Vπ) of MZ modulator 2, and the processing proceeds to step S206.

In step S206, amplitude setter 30 stores the amplitude of the output curve from synchronous detector 12 and the amplitude of the output voltage from amplifier 6 at this time. Thereafter, the processing returns to step S204.

In step S207, amplitude setter 30 controls amplification controller 7 such that the amplitude of the output voltage from amplifier 6 is increased by a predetermined amount ΔV1. Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12.

In step S205, if the amplitude of the output curve from synchronous detector 12 at this time is smaller than the amplitude of the output curve from synchronous detector 12 that has been stored, the processing proceeds to step S206. If the amplitude of the output curve from synchronous detector 12 at this time is equal to or larger than the amplitude of the output curve from synchronous detector 12 that has been stored, the processing proceeds to step S207.

In step S208, if the amplitude of the output curve from synchronous detector 12 at this time is smaller than the amplitude of the output curve from synchronous detector 12 that has been stored, it is determined that the amplitude of the output voltage from amplifier 6 has not exceeded twice the half wave voltage (2Vπ) of MZ modulator 2, and the processing proceeds to step S209. If the amplitude of the output curve from synchronous detector 12 at this time is equal to or larger than the amplitude of the output curve from synchronous detector 12 that has been stored, it is determined that the amplitude of the output voltage from amplifier 6 has exceeded twice the half wave voltage (2Vπ) of MZ modulator 2, and the processing proceeds to step S210.

In step S209, amplitude setter 30 stores the amplitude of the output curve from synchronous detector 12 and the amplitude of the output voltage from amplifier 6. Amplitude setter 30 controls amplification controller 7 such that the amplitude of the output voltage from amplifier 6 is increased by a predetermined amount ΔV1. Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12. Thereafter, the processing returns to step S208.

In step S210, while the amplitude of the output curve from synchronous detector 12 and the amplitude of the output voltage from amplifier 6 that have been stored are kept stored, amplitude setter 30 controls amplification controller 7 such that the amplitude of the output voltage from amplifier 6 is decreased by a predetermined amount ΔV2 (<ΔV1). Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12.

In step S211, if the amplitude of the output curve from synchronous detector 12 at this time is larger than the amplitude of the output curve from synchronous detector 12 that has been stored, the processing proceeds to step S212. If the amplitude of the output curve from synchronous detector 12 at this time is equal to or smaller than the amplitude of the output curve from synchronous detector 12 that has been stored, the processing proceeds to step S213.

In step S212, while the amplitude of the output curve from synchronous detector 12 and the amplitude of the output voltage from amplifier 6 that have been stored are kept stored, amplitude setter 30 controls amplification controller 7 such that the amplitude of the output voltage from amplifier 6 is decreased by a predetermined amount ΔV2 (<ΔV1). Further, amplitude setter 30 causes bias controller 9 to vary the reference DC bias by Vπ or more, while causing synchronous detector 12 to perform synchronous detection. Further, amplitude setter 30 acquires the amplitude of the output curve from synchronous detector 12. Thereafter, the processing returns to step S211.

In step S213, amplitude setter 30 sets the amplitude of the output voltage from amplifier 6 at this time as the driving voltage amplitude, by regarding the amplitude of the output voltage from amplifier 6 at this time as the amplitude of the output voltage from amplifier 6 that minimizes the amplitude of the output curve from synchronous detector 12 as in FIG. 8. The driving voltage amplitude set at this time corresponds to twice the half wave voltage (2Vπ) of MZ modulator 2.

In this case, ΔV1 can be set to be 1/10 of the half wave voltage (Vπ), when the half wave voltage (Vπ) of MZ modulator 2 has been known. Even when Vπ has not been known, if MZ modulator 2 is commercially purchased one, it is possible to provide a value of Vπ that corresponds to a driving voltage amplitude with a lower frequency of about 2 GHz and, therefore, ΔV1 can be set to be 1/10 of this Vπ. If the calculation accuracy is required to be increased, ΔV1 can be made smaller than 1/10 of Vπ. Further, ΔV2 can be set to be 1/10 of ΔV1, for example.

As can be seen from FIG. 8, the amplitude of the output curve from synchronous detector 12 comes to zero, not only at the point of 2Vπ but also at even multiples of Vπ, such as 4Vπ, 6Vπ. Generally, when the frequency range of MZ modulator 2 is equal to or higher than those of check-pattern signals, Vπ that can be obtained in the first embodiment or the second embodiment is equal to or less than twice Vπ at a low frequency of 2 GHz as described above and, therefore, 2Vπ that can be obtained in the second embodiment is never mistaken for values equal to or more than 4Vπ.

The embodiments that have been disclosed here are to be considered in all respects as illustrative and not restrictive. The scope of the present invention is defined by the claims rather than the foregoing description, and is intended to include any modification within the scope and meaning equivalent to the terms of the claims.

REFERENCE SIGNS LIST

1: light source, 2: MZ modulator, 3: splitter, 4: check-pattern generator, 5: data-signal generator, 6: amplifier, 7: amplification controller, 8: dither-signal generator, 9: bias controller, 10: high-speed PD, 11: log detector, 12: synchronous detector, 13: superposition circuitry, 14: selector, 20A: first arm, 20B: second arm, 21A, 21B: modulation electrode, 22A, 22B: phase-difference adjusting electrode, 23: first output device, 24: second output device, 30: amplitude setter, 31: capacitor

The invention claimed is:
1. An optical modulation device comprising:
a Mach-Zehnder ("MZ") modulator for modulating light output continuously from a light source, based on a driving voltage and a bias voltage, to generate a light signal;
a splitter for splitting the light signal;
a photodiode for converting a light signal output from the splitter into an electrical signal;
a log detector for detecting a difference between a local maximum value and a local minimum value of a photodiode signal output from the photodiode;
a dither-signal generator for generating a dither signal during control of a driving voltage amplitude;
a synchronous detector for performing synchronous detection by multiplying an output signal from the log detector by the dither signal;
a bias controller for outputting a reference Direct Current ("DC") bias voltage;
a superposition circuitry for superposing the dither signal on the reference DC bias voltage and outputting a resultant voltage as the bias voltage during the control of the driving voltage amplitude and for outputting the reference DC bias voltage as the bias voltage during operations other than the control of the driving voltage amplitude;
a data signal generator for generating a data signal and outputting the data signal;
a check-pattern generator for outputting a check-pattern signal that is set by a user;
a selector for selecting the check-pattern signal during the control of the driving voltage amplitude and for selecting the data signal during an operation;
an amplifier for amplifying a signal that is selected from the check-pattern signal and the data signal and outputting the signal that is amplified by the amplifier as the driving voltage to the MZ modulator; and
an amplitude setter for determining, by varying an amplitude of an output voltage from the amplifier, a plurality of amplitudes of output curves from the synchronous detector, each of which is obtained by varying the reference DC bias voltage output from the bias controller, and for setting an amplification factor of the amplifier, based on an amplitude of the output voltage from the amplifier that corresponds to an amplitude satisfying a predetermined condition, out of the plural- ity of the amplitudes of the output curves from the synchronous detector, during the control of the driving voltage amplitude.

2. The optical modulation device according to claim 1, wherein the check-pattern signal is a clock signal with a frequency that is half a baud rate of the data signal.

3. The optical modulation device according to claim 1, wherein the amplitude setter sets the amplification factor of the amplifier, based on an amplitude of the output voltage from the amplifier that corresponds to an amplitude having a maximum value, out of the plurality of the amplitudes of the output curves from the synchronous detector, when a driving voltage amplitude is a half wave voltage of the MZ modulator.

4. The optical modulation device according to claim 1, wherein the amplitude setter sets the amplification factor of the amplifier, based on an amplitude of the output voltage from the amplifier that corresponds to an amplitude having a minimum value, out of the plurality of the amplitudes of the output curves from the synchronous detector, when a driving voltage amplitude is twice a half wave voltage of the MZ modulator.

5. The optical modulation device according to claim 1, wherein the amplitude setter acquires the output curves from the synchronous detector, by varying the reference DC bias voltage by an amount equal to or more than a half wave voltage of the MZ modulator.

6. A method for controlling an optical modulation device, the optical modulation device including:
  a Mach-Zehnder ("MZ") modulator for modulating light output continuously from a light source, based on a driving voltage and a bias voltage, to generate a light signal;
  a splitter for splitting the light signal;
  a photodiode for converting a light signal output from the splitter into an electrical signal;
  a log detector for detecting a difference between a local maximum value and a local minimum value of a photodiode signal output from the photodiode;
  a dither-signal generator for generating a dither signal during control of a driving voltage amplitude;
  a synchronous detector for performing synchronous detection by multiplying an output signal from the log detector by the dither signal;
  a bias controller for outputting a reference Direct Current ("DC") bias voltage;
  a superposition circuitry for superposing the dither signal on the reference DC bias voltage and outputting a resultant voltage as the bias voltage during the control of the driving voltage amplitude and for outputting the reference DC bias voltage as the bias voltage during operations other than the control of the driving voltage amplitude;
  a data signal generator for generating a data signal and outputting the data signal;
  a check-pattern generator for outputting a check-pattern signal that is set by a user;
  a selector for selecting the check-pattern signal during the control of the driving voltage amplitude and for selecting the data signal during an operation; and
  an amplifier for amplifying a signal that is selected from the check-pattern signal and the data signal and outputting the signal that is amplified by the amplifier as the driving voltage to the MZ modulator,
the method comprising the steps of:
determining, by varying an amplitude of an output voltage from the amplifier, a plurality of amplitudes of output curves from the synchronous detector, each of which being obtained by varying the reference DC bias voltage output from the bias controller; and
setting an amplification factor of the amplifier, based on an amplitude of the output voltage from the amplifier that corresponds to an amplitude satisfying a predetermined condition, out of the plurality of the amplitudes of the output curves from the synchronous detector.

\* \* \* \* \*